Figure 1:
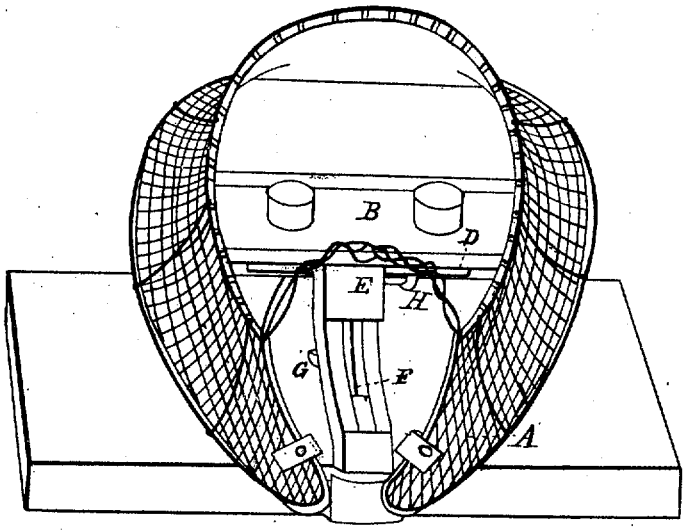
Figure 2:
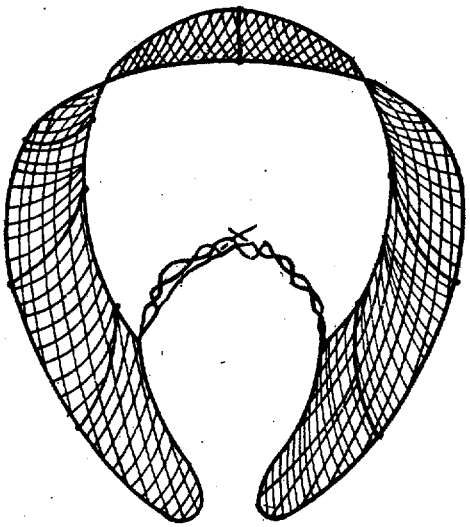
Figure 3:
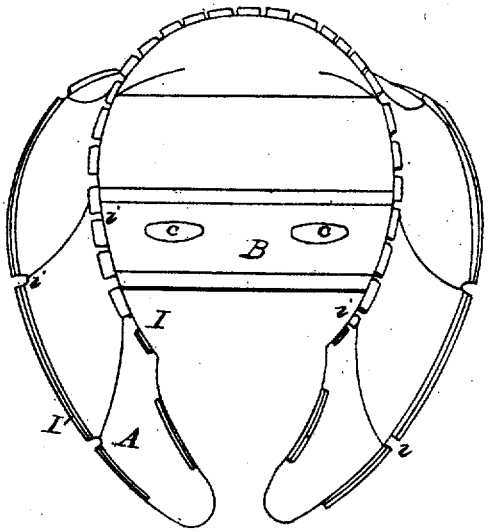

G. A. Cox.

Bonnet.

No 1175

Reissued Apr. 23, 1861.

Witnesses.

Sidney A. Jewett.

A. Sidney Drew

Inventor.

Geo A. Cox.

THE NORRIS PETERS CO., WASHINGTON, D.C.

UNITED STATES PATENT OFFICE.

GEORGE A. COX, OF BROOKLYN, NEW YORK.

IMPROVEMENT IN FORMERS FOR BONNET-FRONTS.

Specification forming part of Letters Patent No. 26,836, dated January 17, 1860; Reissue No. 1,175, dated April 23, 1861.

*To all whom it may concern:*

Be it known that I, GEORGE A. COX, of Brooklyn, Kings county, and State of New York, have invented certain new and useful Improvements in Formers for Bonnet-Fronts; and I do declare the following to be a full, clear, and exact description of the same, reference being had to the accompanying drawings, making a part of this specification, and to the letters of reference marked thereon, in which—

Figure I is a view of my improved former, showing a bonnet-front formed of wire and net upon the same, also the frame upon which the former used may be supported; Fig. II, a view of the wire and net front when completed; Fig. III, a view of the former employed.

In the drawings similar parts of the invention are designated by the same letters of reference.

The wire and net fronts of bonnet-frames have heretofore been made in connection with the frame itself by using buckram as a pattern, to which the wire necessary to form the frame-work has been basted. After this has been done the net or material for covering has been sewed over the wire forming the frame-work. The wire and net front in connection with the frame, being thus formed is ripped from the buckram and is ready for use.

The machine I have perfected and found to operate successfully, affording the advantage of a saving of time and material and reducing the cost of the article produced at least twenty-five per cent., consists of the following parts: A former, A, made of copper or any other metal, and bent into any shape I may desire to give to the front itself. A cross piece of metal, B, extending across the interior of the same, and provided with one or more openings, C C, serves to support the former A upon a frame-work of iron or any material. This frame-work for supporting the former A consists of a cross-piece, D, upon which, by means of the metallic cross-piece B, provided with one or more openings, C C, the former A rests. This cross-piece D is attached directly to a block, E, the axis of which plays in a slotted upright, F, so that by means of screw G the former A can be raised or lowered, and may be adjusted longitudinally by moving it along the slot F, while its position in respect to the party working may be readily changed by rotating the former A on the axis of the block E, the set-screw H being employed to retain it in any desired position.

The machine being thus constructed, my mode of forming the wire and net front of a bonnet-frame is as follows: It will be observed that the former A is provided at its upper and lower edges with a grooved rim, (shown on Fig. III, and marked I and I′,) and that certain portions of the same have been cut away, as indicated by the letters *i i i i*. These grooved rims I and I′ form gutters in which I insert pieces of wire of corresponding length, which serve in connection with the cross-pieces of wire extending from *i* to *i* and twisted or bent around the upper and lower wires placed in the grooved rims I and I′, to form the frame-work of the bonnet-front, the wire being held to the former A during the process of sewing the net or other material used over the frame-work of wire by means of the clamps O O.

I am aware that formers for hats, hat-fronts, &c., have been used, nor do I claim such, either as a unity or in sections; but What I do claim as new, and desire to secure by Letters Patent, is—

1. Providing the former A with the grooved rims I and I′ and interstices *i i*, in the manner shown, and for the purpose set forth.

2. In combination with the same, the frame composed of the parts D, E, and F, when arranged and operated as herein specified, and for the purpose set forth.

GEO. A. COX.

In presence of—
SIDNEY A. JEWETT,
A. SIDNEY DOANE.